United States Patent
Kim et al.

(10) Patent No.: US 7,914,707 B2
(45) Date of Patent: **\*Mar. 29, 2011**

(54) ADDITIVE FOR NON-AQUEOUS ELECTROLYTE AND SECONDARY BATTERY USING THE SAME

(75) Inventors: Yu Sin Kim, Daejeon (KR); Hyeong Jin Kim, Daejeon (KR); Hye Yun Cha, Daejeon (KR); Ho Chun Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/649,100

(22) Filed: Dec. 29, 2009

(65) Prior Publication Data

US 2010/0099905 A1 Apr. 22, 2010

Related U.S. Application Data

(62) Division of application No. 11/406,640, filed on Apr. 19, 2006, now Pat. No. 7,666,330.

(30) Foreign Application Priority Data

Apr. 20, 2005 (KR) .................. 10-2005-0032877

(51) Int. Cl.
*H01B 1/12* (2006.01)
*C07C 255/46* (2006.01)

(52) U.S. Cl. ........ 252/500; 252/521.6; 252/519.32; 252/519.3; 252/518.1; 252/519.4; 252/519.21; 252/519.2; 252/521.5; 252/364; 558/303; 558/431

(58) Field of Classification Search .......... 252/521.6, 252/519.32, 519.3, 518.1, 519.4, 364, 500, 252/519.21, 519.2, 521.5; 558/303, 431
See application file for complete search history.

(56) References Cited

U.S. PATENT DOCUMENTS

| | | | | |
|---|---|---|---|---|
| 4,130,502 | A * | 12/1978 | Eidenschink et al. | ... 252/299.63 |
| 4,528,114 | A | 7/1985 | Petrzilka | |
| 4,629,581 | A | 12/1986 | Boller et al. | |
| 4,723,005 | A | 2/1988 | Huynh-Ba et al. | |
| 4,877,548 | A * | 10/1989 | Kitano et al. | ............. 252/299.63 |
| 4,985,583 | A | 1/1991 | Eidenschink et al. | |
| 5,142,393 | A * | 8/1992 | Okumura et al. | ............. 349/121 |
| 5,840,208 | A | 11/1998 | Yamaguchi et al. | |
| 6,007,740 | A | 12/1999 | Andou et al. | |
| 6,074,777 | A | 6/2000 | Reimers et al. | |
| 6,852,863 | B2 * | 2/2005 | Cameron et al. | ............. 546/313 |
| 6,866,966 | B2 | 3/2005 | Hamamoto et al. | |
| 7,666,330 | B2 * | 2/2010 | Kim et al. | ............. 252/519.21 |
| 2002/0122988 | A1 | 9/2002 | Hamamoto et al. | |
| 2003/0035917 | A1 | 2/2003 | Hyman | |
| 2004/0002002 | A1 | 1/2004 | Mizuta et al. | |
| 2004/0013946 | A1 | 1/2004 | Abe et al. | |
| 2004/0138387 | A1 | 7/2004 | Terahara et al. | |

FOREIGN PATENT DOCUMENTS

| | | |
|---|---|---|
| EP | 0759641 A1 | 2/1997 |
| JP | 58-099456 | 6/1983 |
| JP | 09301897 | 11/1997 |
| JP | 2002246066 A | 8/2002 |
| JP | 2002313415 A | 10/2002 |
| JP | 2003308875 A | 10/2003 |
| KR | 1020050075297 | 7/2005 |
| TW | 541739 | 7/2003 |
| TW | 543216 | 7/2003 |
| WO | 2005076403 A1 | 8/2005 |

OTHER PUBLICATIONS

Reg. No. 524048-19-9, Jun. 2, 2003.*
Reg. No. 94681-53-5, Feb. 9, 1985.*
Reg. No. 73204-08-7, Nov. 16, 1984.*
CAS Reg. No. 302907-65-9, Nov. 16, 2000.*
International Search Report dated Aug. 8, 2006 for Application No. PCT/KR2006/001488.
Extended European Search Report for 06747398.3-2119/1882282 dated Sep. 7, 2009.
Search Report for Patent Application No. 095113948; TW; Sep. 2, 2009.
Reg. No. 32274-07-0, Nov. 16, 1984.
Reg. No. 86871-36-5, Nov. 16, 1984.

\* cited by examiner

*Primary Examiner* — Douglas Mc Ginty
(74) *Attorney, Agent, or Firm* — Cantor Colburn LLP

(57) ABSTRACT

Disclosed is a compound represented by the following formula 1:

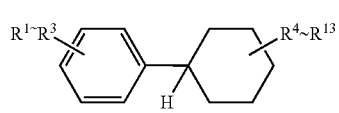

[formula 1]

wherein, each of $R^1$~$R^{13}$ independently represents —H, —F, —Cl, —Br, —I, —OH, —SH, —COOH, —PO$_3$H$_2$, —NH$_2$, —NO$_2$, —O(CH$_2$CH$_2$O)$_n$H (wherein, n is an integer of 1~5), $C_1$~$C_{12}$ alkyl group, $C_1$~$C_{12}$ aminoalkyl group, $C_1$~$C_{12}$ hydroxyalkyl group, $C_1$~$C_{12}$ haloalkyl group, $C_2$~$C_{12}$ alkenyl group, $C_1$~$C_{12}$ alkoxy group, $C_1$~$C_{12}$ alkylamino group, $C_1$~$C_{12}$ dialkylamino group, $C_6$~$C_{18}$ aryl group, $C_6$~$C_{18}$ aminoaryl group, $C_6$~$C_{18}$ hydroxyaryl group, $C_6$~$C_{18}$ haloaryl group, $C_7$~$C_{18}$ benzyl group, $C_7$~$C_{18}$ aminobenzyl group, $C_7$~$C_{18}$ hydroxybenzyl group, $C_7$~$C_{18}$ halobenzyl group, or nitrile group (—CN); and at least one of $R^4$~$R^{13}$ is nitrile group (—CN). A non-aqueous electrolyte comprising: (i) a lithium salt, (ii) a solvent, and (iii) a compound represented by formula 1; and a secondary battery comprising the non-aqueous electrolyte are also disclosed. When the compound represented by formula 1 is added to a non-aqueous electrolyte, it is possible to improve the safety of a secondary battery in an overcharged state.

3 Claims, 3 Drawing Sheets

ADDITIVE FOR NON-AQUEOUS ELECTROLYTE AND SECONDARY BATTERY USING THE SAME

CROSS REFERENCE TO RELATED APPLICATIONS

This application is a divisional of U.S. application Ser. No. 11/406,640, filed on Apr. 19, 2006, now U.S. Pat. No. 7,666,330, which claims priority to Korean Patent Application No. 10-2005-32877, filed on Apr. 20, 2005, and all the benefits accruing therefrom under 35 U.S.C. 119, the contents of which are herein incorporated by reference in their entirety.

FIELD OF THE INVENTION

The present invention relates to an additive for a non-aqueous electrolyte and a non-aqueous electrolyte secondary battery comprising the same. More particularly, the present invention relates to an additive for a non-aqueous electrolyte, which can improve the safety of a secondary battery upon overcharge, and to a non-aqueous electrolyte secondary battery comprising the same.

BACKGROUND OF THE INVENTION

Recently, there has existed increasing interest in energy storage technology. Batteries have been widely used as energy sources in portable phones, camcorders, notebook computers, PCs and electric cars, resulting in intensive research and development for them. In this regard, electrochemical devices are the subject of great interest. Particularly, development of rechargeable secondary batteries is the focus of attention. Recently, continuous studies have been performed to develop a novel electrode and battery having an improved level of capacity density and specific energy.

Among the currently used secondary batteries, lithium secondary batteries, developed in early 1990's, have a drive voltage and an energy density higher than those of conventional batteries using aqueous electrolytes (such as Ni-MH batteries, Ni—Cd batteries and $H_2SO_4$—Pb batteries), and thus are spotlighted in the field of secondary batteries. However, lithium secondary batteries have a problem related to their safety, due to ignition and explosion caused by the use of a non-aqueous electrolyte. The aforementioned problem becomes more serious as the capacity density of a battery increases.

Meanwhile, in the case of a non-aqueous electrolyte secondary battery, problems related to safety occur under overcharge conditions due to the following reasons: Cathode active materials, such as a lithium-containing metal oxide, capable of lithium and/or lithium ion intercalation/deintercalation are converted into thermally unstable structure due to the deintercalation of lithium under overcharge conditions. Under such overcharged conditions, if the battery reaches a critical temperature due to external physical impact (e.g. exposure to high temperature), oxygen is liberated from the cathode active material having an unstable structure. Then, the oxygen causes an exothermic decomposition reaction with an electrolyte solvent, or the like. Also, combustion of the electrolyte, caused by the above exothermic reaction, is accelerated by the oxygen liberated from the cathode. Such chain reactions accompanied with heat emission finally cause a so-called thermal runaway phenomenon of the battery, resulting in explosion and breakage of the battery.

Many solutions have been suggested in order to control the ignition or explosion of a battery, caused by an increase in the internal temperature of the battery. For example, it is known to use an additive for a non-aqueous electrolyte. Such additives for a non-aqueous electrolyte include an additive based on a reduction-oxidation shuttle reaction, such as chloroanisole, an additive based on a polymerization reaction, such as biphenyl, an alkylbenzene derivative such as cyclohexylbenzene, or the like.

However, the additive based on a reduction-oxidation shuttle reaction is not effective under a high charging current. Additionally, biphenyl has a problem related to the quality of a battery when it is used alone as an additive for a non-aqueous electrolyte, due to an increase in the resistance of the battery. Further, when using an alkylbenzene derivative such as cyclohexylbenzene, there are problems in that a large amount of additive should be added to prevent heat emission caused by overcharge, and prevention of overcharge cannot be accomplished after repeating charge/discharge cycles, resulting in degradation in the quality of a battery.

Therefore, there is a continuous need for a means for improving the safety of a non-aqueous electrolyte secondary battery.

DISCLOSURE OF THE INVENTION

The present inventors have found that when a compound that comprises cyclohexylbenzene, having at least one nitrile group introduced thereto, is used as an additive for a non-aqueous electrolyte in a secondary battery, it is possible to improve the safety of the battery upon overcharge of the battery more significantly compared to cyclohexylbenzene (CHB), which has been used conventionally as an additive for a non-aqueous electrolyte. The present inventors have also found that the above compound is used as an additive for a non-aqueous electrolyte in combination with cyclohexylbenzene, it is possible to obtain a synergic effect in terms of the safety upon overcharge. The present invention is based on these findings.

Therefore, an object of the present invention is to provide a compound comprising cyclohexylbenzene having a nitrile group added thereto. Another object of the present invention is to provide a non-aqueous electrolyte comprising the above compound optionally with cyclohexylbenzene, as additives; and a secondary battery comprising the above non-aqueous electrolyte.

According to an aspect of the present invention, there is provided a compound represented by the following formula 1:

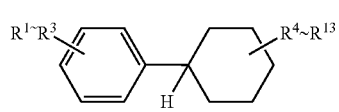

[formula 1]

wherein, each of $R^1 \sim R^{13}$ independently represents —H, —F, —Cl, —Br, —I, —OH, —SH, —COOH, —$PO_3H_2$, —$NH_2$, —$NO_2$, —O($CH_2CH_2O$)$_n$H (wherein, n is an integer of 1~5), $C_1 \sim C_{12}$ alkyl group, $C_1 \sim C_{12}$ aminoalkyl group, $C_1 \sim C_{12}$ hydroxyalkyl group, $C_1 \sim C_{12}$ haloalkyl group, $C_2 \sim C_{12}$ alkenyl group, $C_1 \sim C_{12}$ alkoxy group, $C_1 \sim C_{12}$ alkylamino group, $C_1 \sim C_{12}$ dialkylamino group, $C_6 \sim C_{18}$ aryl group, $C_6 \sim C_{18}$ aminoaryl group, $C_6 \sim C_{18}$ hydroxyaryl group, $C_6 \sim C_{18}$ haloaryl group, $C_7 \sim C_{18}$ benzyl group, $C_7 \sim C_{18}$ aminobenzyl group, $C_7 \sim C_{18}$ hydroxybenzyl group, $C_7 \sim C_{18}$ halobenzyl group, or nitrile group (—CN); and at least one of $R^4 \sim R^{13}$ is nitrile group (—CN).

According to another aspect of the present invention, there is provided a non-aqueous electrolyte comprising: (i) a lithium salt, (ii) a solvent, and (iii) a compound represented by the above formula 1.

According to still another aspect of the present invention, there is provided a non-aqueous electrolyte, which comprises a compound represented by the above formula 1, and further comprises cyclohexylbenzene or a derivative thereof, as additives. Herein, the derivative of cyclohexylbenzene includes any compound represented by formula 1, having no nitrile group introduced into the cyclohexyl ring.

According to yet another aspect of the present invention, there is provided a secondary battery comprising a cathode, an anode and the aforementioned non-aqueous electrolyte.

Hereinafter, the present invention will be explained in more detail.

According to the present invention, the compound represented by formula 1 is characterized by comprising 1~10 nitrile (—CN) groups introduced into the cyclohexyl ring present in cyclohexylbenzene or a derivative thereof.

In the compound represented by formula 1, nitrile groups may be positioned at the same carbon atom or at different carbon atoms on the cyclohexyl ring.

Preferred examples of the compound represented by formula 1 or the derivatives of cyclohexylbenzene include compounds substituted with $C_1$~$C_6$ alkyl groups on the benzene ring or on the cyclohexyl ring. This is because a $C_1$~$C_6$ alkyl group does not inhibit the compound represented by formula 1 or the cyclohexylbenzene portion from exerting the effect of improving the safety of a battery upon overcharge. Therefore, the compound represented by formula 1 or the derivatives of cyclohexylbenzene may be any compounds, as long as they are substituted with a substituent that does not inhibit the compound represented by formula 1 or the cyclohexylbenzene portion from exerting the effect of improving the safety of a battery upon overcharge. Such compounds are also included in the scope of the present invention.

In the present invention, non-limiting examples of the compound represented by formula 1 include:

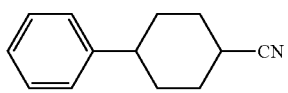

(4-cyanocyclohexyl benzene), 3-cyanocyclohexyl benzene, 2-cyanocyclohexyl benzene, 2,3-dicyanocyclohexyl benzene, 2,4-dicyanocyclohexyl benzene, 3,4-dicyanocyclohexyl benzene, 2,3,4-tricyanocyclohexyl benzene, 2,3,4,5,6-pentacyanocyclohexyl benzene, or the like.

The cyclohexylbenzene portion of the compound represented by formula 1 can prevent a secondary battery from igniting/exploding upon its overcharged state based on the same functional mechanism as cyclohexylbenzene (CHB), which has been used conventionally as an additive for a non-aqueous electrolyte.

In other words, the cyclohexylbenzene portion forms a polymer on the surface of a cathode upon the overcharged state of a battery, and the polymer increases the interfacial impedance between the cathode and an electrolyte, thereby preventing overcharge. Hence, it is possible to prevent the battery from igniting/exploding upon overcharge.

Herein, the nitrile group forms a coordination bond with a transition metal, such as Co, present on the surface of the cathode, and thus permits the compound represented by formula 1 or a derivative thereof to be anchored in the vicinity of the cathode surface and allows the polymer to be formed predominantly and easily on the cathode surface. Therefore, it is possible to maximize the effect of preventing a battery from igniting/exploding upon overcharge.

Additionally, the polymer formed on the cathode surface by the compound represented by formula 1 serves as a core for the polymer formation, and thus enhances the formation of polymer from cyclohexylbenzene, which is further added to an electrolyte. Therefore, it is possible to provide a synergic effect for preventing overcharge (see Examples 2 and 3, and FIG. 1).

Such synergic effects can also be obtained from benzene derivatives, besides cyclohexylbenzene, wherein the benzene derivatives include biphenyl, terphenyl, fluorotoluene, or the like. This is because the aforementioned benzene derivatives have the same mechanism of polymer formation as cyclohexylbenzene. Therefore, a non-aqueous electrolyte comprising a benzene derivative, such as biphenyl, terphenyl or fluorotoluene, in addition to the compound represented by formula 1, is also included in the scope of the present invention.

Cyclohexylbenzene forms a polymer at an oxidation potential of 4.7V and the compound represented by formula 1 forms a polymer at an oxidation potential of about 4.6~4.8V, although the potential may be different depending on the electrode used on the battery.

Meanwhile, excessive oxidation in a cathode, caused by overcharge, results in loss of an abnormally large amount of electrons in the cathode, and thus results in structural collapse of the cathode. Herein, the cathode active material comprises a transition metal, such as Co. The nitrile group on the compound represented by formula 1 donates electrons to the transition metal element, such as Co, thereby serving to prevent the cathode from experiencing structural collapse. Such effect can be obtained because the nitrile group can form a coordination bond with a transition metal, such as Co. In other words, the nitrile group shares the electrons with the transition metal element such as Co.

Therefore, it is possible to improve the safety of a battery by preventing the liberation of oxygen caused by structural collapse of a cathode, even when the battery is overcharged and is exposed to external impact (e.g. high temperature).

The compound represented by formula 1 can be used in an amount determined according to its solubility to the solvent used in the non-aqueous electrolyte. However, if the compound represented by formula 1 is used in an excessively large amount, the electrolyte may show excessively increased viscosity and decreased ion conductivity. Therefore, it is preferable that the compound represented by formula 1 is contained in an amount of 0.5~10 wt % per 100 wt % of the non-aqueous electrolyte. If the compound represented by formula 1 is used in an amount of less than 0.5 wt %, it is not possible to obtain the effect of preventing overcharge to a sufficient degree. On the other hand, if the compound is used in an amount of greater than 10 wt %, there are problems of degradation in the lifespan of a battery at high temperature and gas generation under high temperature storage conditions.

Additionally, when the compound represented by formula 1 is used in combination with cyclohexylbenzene or a benzene derivative, it is preferable that the compound represented by formula 1 is used in an amount of 0.5~10 wt % per 100 wt % of the non-aqueous electrolyte in the same manner as described above.

For example, a compound represented by formula 2, which is a preferred embodiment of the compound represented by formula 1, may be prepared according to the following reaction scheme 1:

[formula 2]

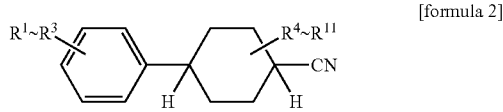

wherein, each of $R^1$~$R^{11}$ independently represents —H, —F, —Cl, —Br, —I, —OH, —SH, —COOH, —PO$_3$H$_2$, —NH$_2$, —NO$_2$, —O(CH$_2$CH$_2$O)$_n$H (wherein, n is an integer of 1~5), $C_1$~$C_{12}$ alkyl group, $C_1$~$C_{12}$ aminoalkyl group, $C_1$~$C_{12}$ hydroxyalkyl group, $C_1$~$C_{12}$ haloalkyl group, $C_2$~$C_{12}$ alkenyl group, $C_1$~$C_{12}$ alkoxy group, $C_1$~$C_{12}$ alkylamino group, $C_1$~$C_{12}$ dialkylamino group, $C_6$~$C_{18}$ aryl group, $C_6$~$C_{18}$ aminoaryl group, $C_6$~$C_{18}$ hydroxyaryl group, $C_6$~$C_{18}$ haloaryl group, $C_7$~$C_{18}$ benzyl group, $C_7$~$C_{18}$ aminobenzyl group, $C_7$~$C_{18}$ hydroxybenzyl group, $C_7$~$C_{18}$ halobenzyl group, or nitrile group (—CN).

[reaction scheme 1]

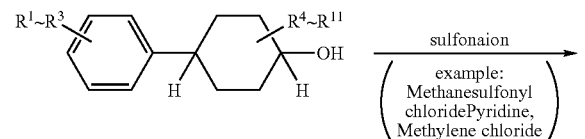

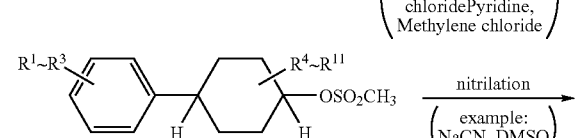

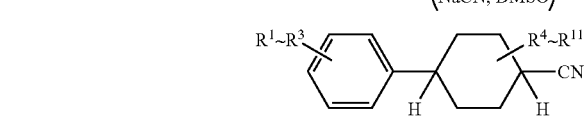

wherein each of $R^1$~$R^{11}$ is the same as defined in the above formula 2.

Additionally, a compound represented by the following formula 3 and a compound represented by the following formula 4, which are preferred embodiments of the compound represented by formula 1, may be prepared by the following reaction scheme 2 and reaction scheme 3, respectively:

[formula 3]

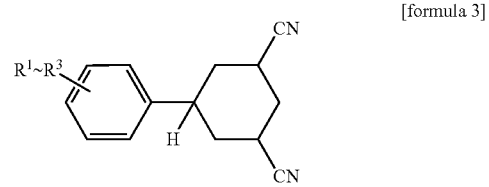

wherein each of $R^1$~$R^3$ is the same as defined in the above formula 2.

[reaction scheme 2]

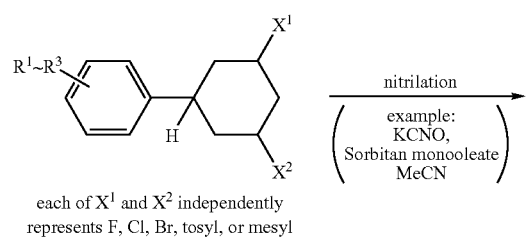

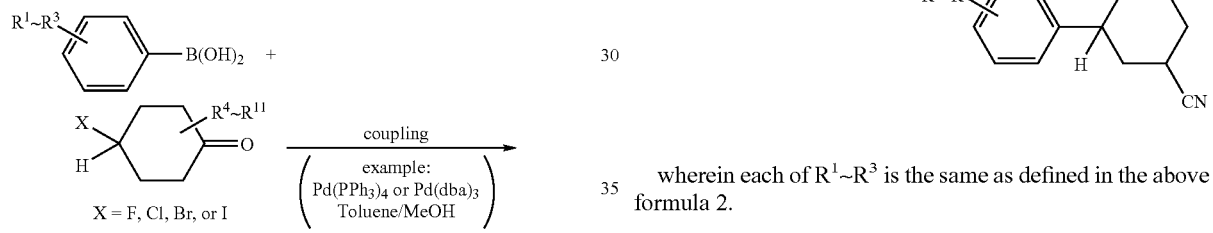

wherein each of $R^1$~$R^3$ is the same as defined in the above formula 2.

[formula 4]

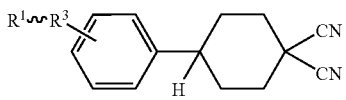

wherein each of $R^1$~$R^3$ is the same as defined in the above formula 2.

[reaction scheme 3]

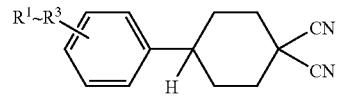

wherein each of $R^1$~$R^3$ is the same as defined in the above formula 2.

It is a matter of course that other compounds represented by the above formula 1 can be prepared with ease by modifying the starting materials or reaction conditions from the above reaction schemes 1 to 3.

The present invention also provides a secondary battery comprising a cathode, an anode and a non-aqueous electrolyte, wherein the non-aqueous electrolyte comprises the compound represented by formula 1, optionally with cyclohexylbenzene or a derivative thereof, as additives.

Preferably, the cathode active material that may be used in the present invention is a lithium-containing transition metal oxide, and particular examples thereof include at least one lithium-containing transition metal oxide selected from the group consisting of: $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-Y}Co_YO_2$, $LiCo_{1-y}Mn_yO_2$, $LiNi_{1-y}Mn_yO_2$ (wherein $0\leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $LiCoPO_4$, and $LiFePO_4$.

The anode active material that may be used in the present invention includes a material capable of lithium ion intercalation/deintercalation, and particular examples thereof include graphite, carbon, lithium metal or lithium alloys. Preferably, the anode active material is graphite. Herein, the anode may comprise a binder, and particular examples of the binder include PVDF (polyvinylidene fluoride) or SBR (styrene butadiene rubber), but are not limited thereto.

The non-aqueous electrolyte comprises a solvent, such as a cyclic carbonate, a linear carbonate or a combination thereof. Particular examples of the cyclic carbonate include ethylene carbonate (EC), propylene carbonate (PC), gamma-butyrolactone (GBL), or the like. Particular examples of the linear carbonate include diethyl carbonate (DEC), dimethyl carbonate (DMC), ethylmethyl carbonate (EMC), methyl propyl carbonate (MPC), or the like. However, the solvent that may be used in the electrolyte according to the present invention is not limited to the above examples.

The non-aqueous electrolyte comprises a lithium salt as an electrolyte substance. Particular examples of the lithium salt include $LiClO_4$, $LiCF_3SO_3$, $LiPF_6$, $LiBF_4$, $LiAsF_6$, $LiN(CF_3SO_2)_2$, or the like, but are not limited thereto.

The secondary battery according to the present invention may comprise a separator. Preferably, the separator is a porous separator. Particular examples of the porous separator include polypropylene-, polyethylene- or polyolefin-based separators, but are not limited thereto.

The secondary battery according to the present invention may be manufactured by a conventional method, except that the compound represented by formula 1 is added to a non-aqueous electrolyte. In one embodiment of the method, a porous separator is interposed between a cathode and an anode to provide an electrode assembly, and then the non-aqueous electrolyte in injected thereto.

In addition to the compound represented by formula 1, the non-aqueous electrolyte according to the present invention may further comprise other additives.

The secondary battery according to the present invention may have various shapes, including a cylindrical shape, a prismatic shape or a pouch-like shape.

MODE FOR CARRYING OUT THE INVENTION

Reference will now be made in detail to the preferred embodiments of the present invention. It is to be understood that the following examples are illustrative only and the present invention is not limited thereto.

[Preparation of 4-cyanocyclohexyl Benzene]

Figure 1:
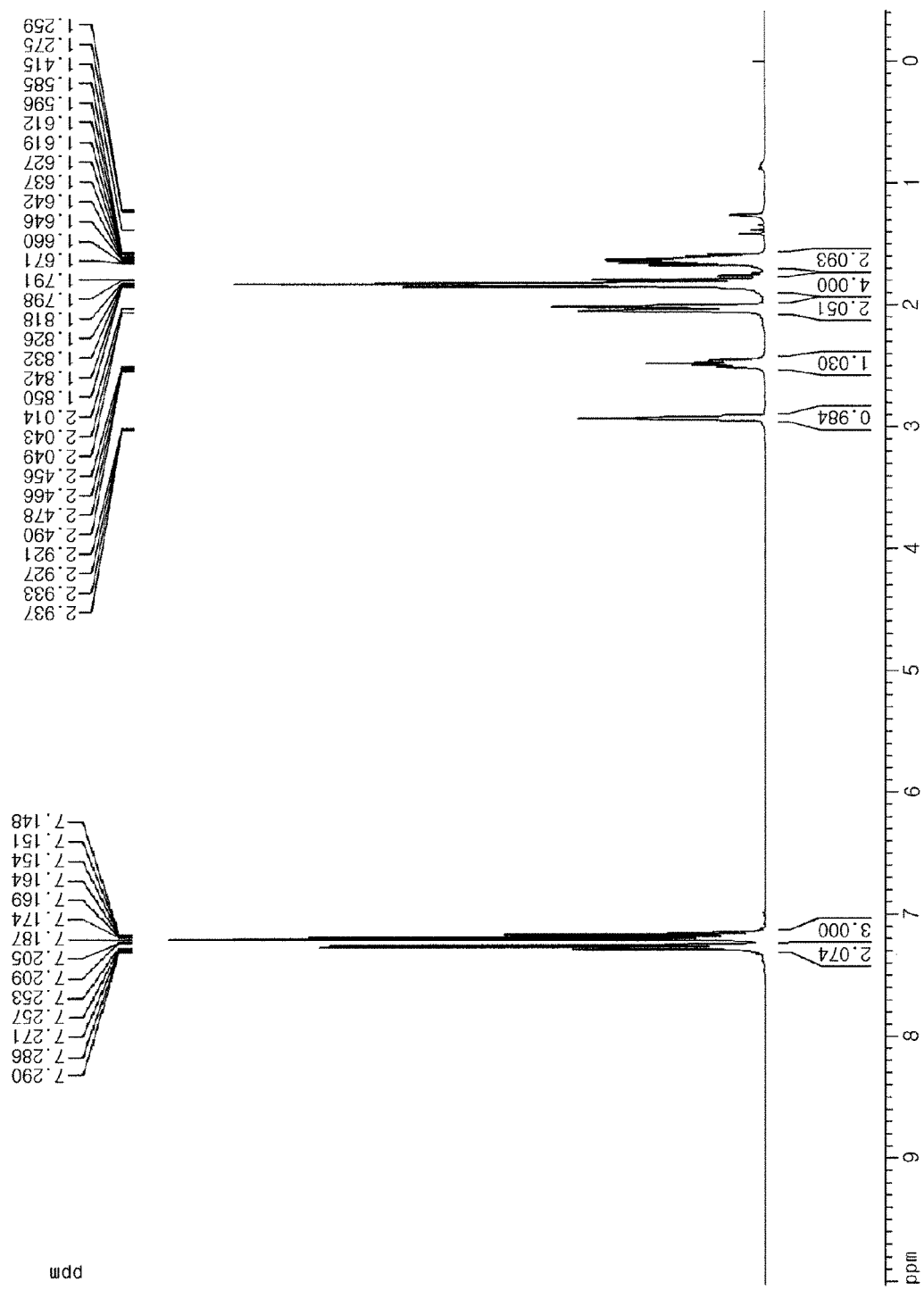
FIG. 1 is the H-NMR spectrum of 4-cyanocyclohexyl benzene obtained from a preferred embodiment of the present invention.
Figure 2:
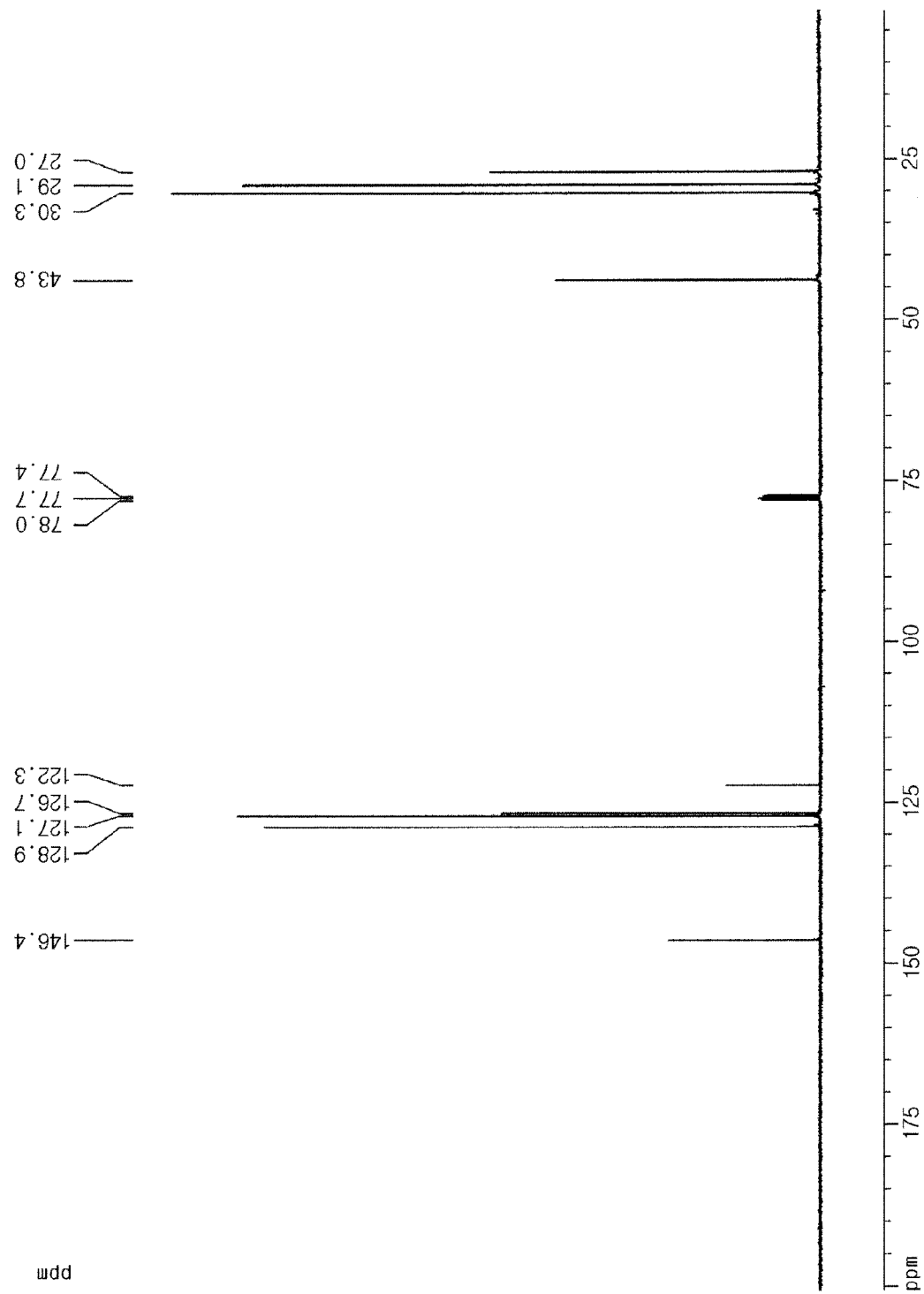
FIG. 2 is the C-NMR spectrum of 4-cyanocyclohexyl benzene obtained from a preferred embodiment of the present invention.

A compound represented by the following formula 5 (4-cyanocyclohexyl benzene) was prepared according to a process represented by the following reaction scheme 4. The H-NMR spectrum and the C-NMR spectrum of the resultant compound represented by formula 5 (4-cyanocyclohexyl benzene) are shown in FIG. 1 and FIG. 2, respectively.

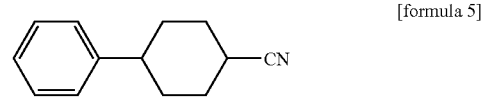

[formula 5]

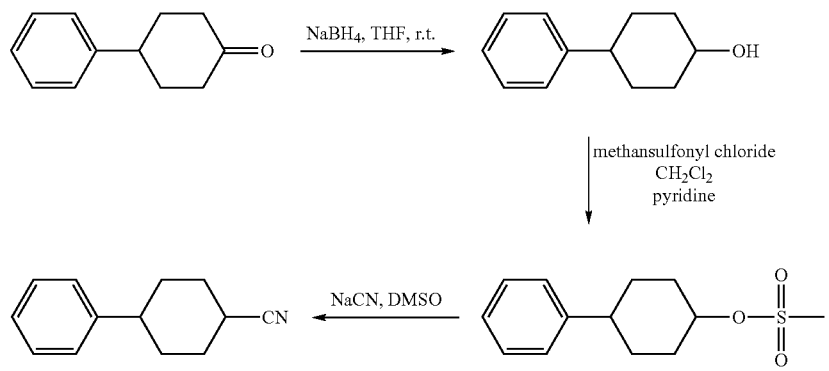

[reaction scheme 4]

[Manufacture of Battery]

EXAMPLE 1

The electrolyte used in this example was 1M $LiPF_6$ solution containing EC:EMC=1:2 (v:v). To the electrolyte, the compound represented by formula 5 was added in an amount of 2.0 wt %. $LiCoO_2$ and artificial graphite were used as a cathode active material and an anode active material, respectively. Then, a coin type battery was manufactured by using a conventional method.

EXAMPLES 2

Example 1 was repeated to provide a battery, except that the compound represented by formula 5 was added to the electrolyte in an amount of 0.5 wt % and CHB (cyclohexylbenzene) was further added thereto in an amount of 1.5 wt %.

EXAMPLE 3

Example 1 was repeated to provide a battery, except that the compound represented by formula 5 was added to the electrolyte in an amount of 0.5 wt % and CHB (cyclohexylbenzene) was further added thereto in an amount of 2.0 wt %.

COMPARATIVE EXAMPLE 1

Example 1 was repeated to provide a battery, except that the compound represented by formula 5 was not added to the electrolyte and CHB was added to the electrolyte in an amount of 2.0 wt %.

[Overcharge Test]

The batteries according to Examples 1 to 3 and Comparative Example 1 were subjected to one charge/discharge cycle at 0.1 C and two charge/discharge cycles at 0.2 C, and then were charged at 0.2 C to a voltage of 7V. Then, voltage of each battery was observed. The results are shown in FIG. 3.

Interruption of overcharge can be seen from a rapid increase in the voltage, caused by an increase in the resistance, under constant current (V=IR).

Figure 3:
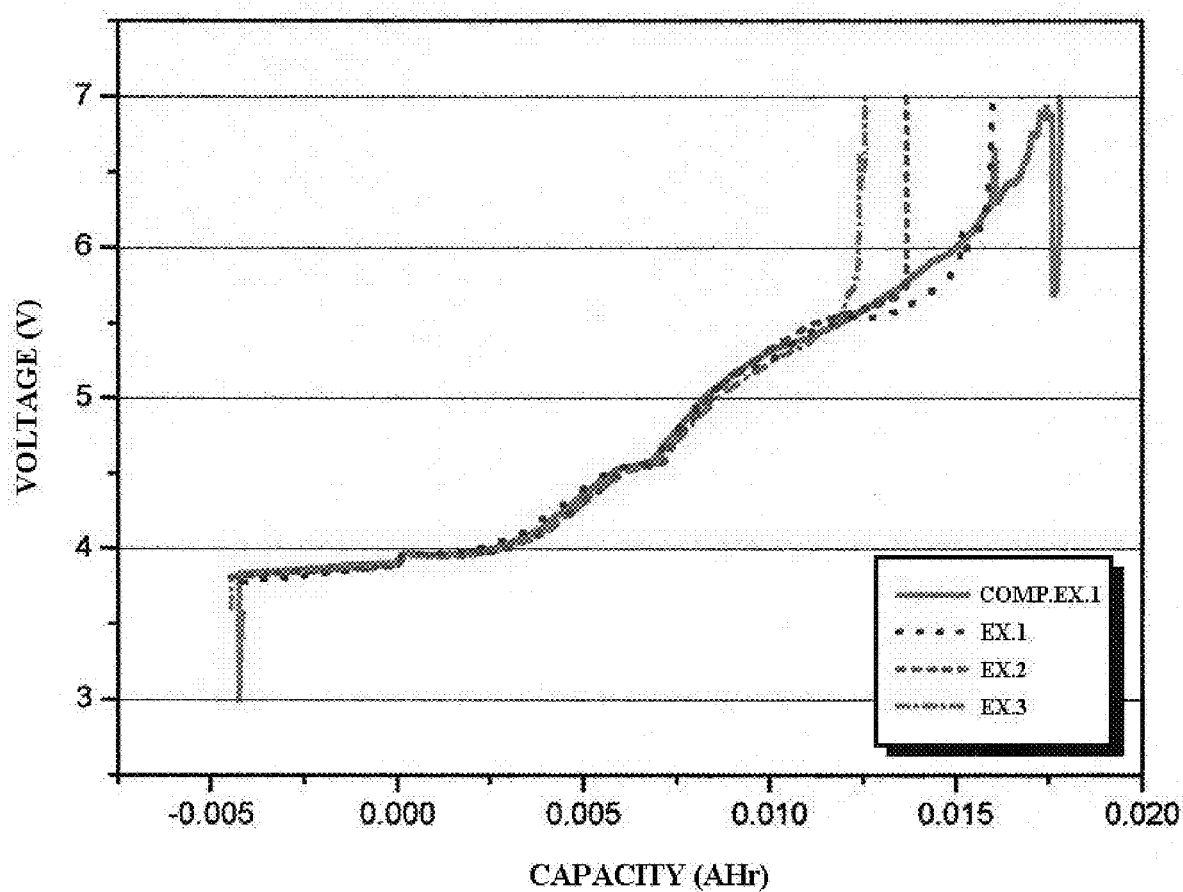
FIG. 3 is a graph showing the effect of preventing overcharge in the batteries according to Examples 1~3 and the Comparative Example 1.

As shown in FIG. 3, when the batteries are overcharged, the batteries according to Examples 1 to 3 interrupt overcharge more promptly (i.e. under a smaller charging capacity) and more effectively, as compared to the battery according to Comparative Example 1.

After comparing the result obtained from the battery according to Example 1 (compound represented by formula 5) with the result obtained from the battery according to Comparative Example 1 (CHB), it can be seen that the compound represented by formula 5, having a nitrile group, forms a polymer capable of functioning as an electric resistance more promptly, compared to CHB, and thus interrupts overcharge more effectively.

Meanwhile, after comparing the results obtained from the batteries according to Comparative Example 1 (CHB) and Example 1 (compound represented by formula 5) with the results obtained from the batteries according to Examples 2 and 3 (compound represented by formula 5+CHB), it can be seen that the compound represented by formula 5 and CHB provide a synergic effect when interrupting overcharge (i.e. when forming a polymer capable of interrupting an overcharged state).

INDUSTRIAL APPLICABILITY

As can be seen from the foregoing, the present invention provides an additive for a non-aqueous electrolyte and a combination of additives, effective for preventing a secondary battery from being overcharged. Therefore, the additive according to the present invention can improve the safety of a battery upon overcharge.

What is claimed is:

1. A compound selected from the group consisting of formula 2, formula 3 and formula 4:

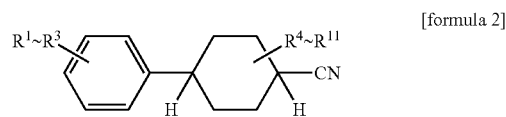

[formula 2]

wherein each of $R^1 \sim R^{11}$ independently represents —H, —F, —Cl, —Br, —I, —SH, —COOH, —$PO_3H_2$, —$NH_2$, —$NO_2$, —$O(CH_2CH_2O)_nH$ (wherein n is an integer of 1~5), $C_1$~$C_{12}$ alkyl group, $C_1$~$C_{12}$ aminoalkyl group, $C_1$~$C_{12}$ hydroxyalkyl group, $C_1$~$C_{12}$ haloalkyl group, $C_2$~$C_{12}$ alkenyl group, $C_1$~$C_{12}$ alkoxy group, $C_1$~$C_{12}$ alkylamino group, $C_1$~$C_{12}$ dialkylamino group, $C_6$~$C_{18}$ aryl group, $C_6$~$C_{18}$ aminoaryl group, $C_6$~$C_{18}$ hydroxyaryl group, $C_6$~$C_{18}$ haloaryl group, $C_7$~$C_{18}$ benzyl group, $C_7$~$C_{18}$ aminobenzyl group, $C_7$~$C_{18}$ hydroxybenzyl group, $C_7$~$C_{18}$ halobenzyl group, or nitrile group (—CN), wherein at least one of $R^1$—$R^{11}$ of formula 2 is a nitrile group;

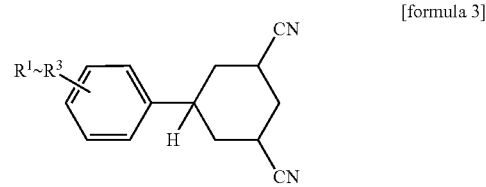

[formula 3]

wherein each of $R^1 \sim R^3$ is the same as defined in the above formula 2; and

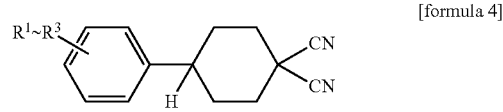

[formula 4]

wherein each of $R^1 \sim R^3$ is the same as defined in the above formula 2.

2. The compound according to claim 1, wherein at least two of $R^1$~$R^{11}$ are a nitrile group (—CN).

3. The compound according to claim 1, wherein at least two of $R^4$~$R^{11}$ are a nitrile group (—CN).

* * * * *